(12) United States Patent  
Velde

(10) Patent No.: US 8,880,301 B2  
(45) Date of Patent: Nov. 4, 2014

(54) TORQUE CONTROL FOR FRONT WHEEL DRIVE

(71) Applicant: Deere & Company, Moline, IL (US)

(72) Inventor: Todd Velde, Dubuque, IA (US)

(73) Assignee: Deere & Company, Moline, IL (US)

( * ) Notice: Subject to any disclaimer, the term of this patent is extended or adjusted under 35 U.S.C. 154(b) by 49 days.

(21) Appl. No.: 13/676,388

(22) Filed: Nov. 14, 2012

(65) Prior Publication Data

US 2014/0136058 A1 May 15, 2014

(51) Int. Cl.
*B62D 9/00* (2006.01)
*B62D 12/00* (2006.01)
*F16H 61/00* (2006.01)
*E02F 3/76* (2006.01)

(52) U.S. Cl.
CPC ............... *F16H 61/00* (2013.01); *B62D 12/00* (2013.01); *E02F 3/764* (2013.01); *B62D 9/002* (2013.01); *B60Y 2200/411* (2013.01)
USPC ............................................. 701/50; 701/99

(58) Field of Classification Search
CPC ........ B62D 9/002; E02F 3/7636; E02F 3/764; B60Y 2200/41
See application file for complete search history.

(56) References Cited

U.S. PATENT DOCUMENTS

| | | |
|---|---|---|
| 4,186,618 A | 2/1980 | Richards |
| 5,147,010 A | 9/1992 | Olson et al. |
| 5,941,330 A | 8/1999 | Miller et al. |
| 6,039,133 A | 3/2000 | Zulu |
| 6,508,328 B1 | 1/2003 | Kenyon et al. |
| 6,614,429 B1 | 9/2003 | Zhang et al. |
| 6,631,320 B1* | 10/2003 | Holt et al. .................. 701/83 |
| 6,857,494 B2 | 2/2005 | Kobayashi et al. |
| 7,325,636 B2* | 2/2008 | Yeoman et al. ............. 180/62 |
| 7,712,559 B2 | 5/2010 | Yeoman et al. |
| 7,766,104 B2 | 8/2010 | Newberry et al. |
| 7,891,182 B2* | 2/2011 | Kelly et al. ................. 60/431 |
| 8,352,145 B2 | 1/2013 | Uematsu et al. |
| 8,381,853 B2 | 2/2013 | Iwaki et al. |
| 8,626,404 B2* | 1/2014 | Thomson et al. ............ 701/50 |
| 2002/0027025 A1 | 3/2002 | Kobayashi et al. |
| 2006/0097683 A1 | 5/2006 | Hosoda et al. |
| 2008/0091325 A1 | 4/2008 | Yeoman et al. |
| 2008/0255735 A1 | 10/2008 | Marathe et al. |
| 2009/0043439 A1 | 2/2009 | Barfoot et al. |
| 2010/0161190 A1 | 6/2010 | McCann et al. |
| 2011/0155486 A1 | 6/2011 | Iwaki et al. |
| 2011/0257861 A1 | 10/2011 | Uematsu et al. |
| 2011/0270497 A1 | 11/2011 | Uematsu et al. |
| 2012/0041651 A1 | 2/2012 | Uematsu et al. |
| 2013/0013158 A1* | 1/2013 | Weber et al. ................ 701/50 |
| 2013/0192919 A1 | 8/2013 | Subrt et al. |
| 2014/0005899 A1 | 1/2014 | Byers et al. |
| 2014/0131122 A1 | 5/2014 | Velde |

OTHER PUBLICATIONS

Exhibit A—Photograph of a compact truck loader with an implement attachment, undated, Admitted Prior Art.

(Continued)

*Primary Examiner* — John R Olszewski
*Assistant Examiner* — Todd Melton
(74) *Attorney, Agent, or Firm* — Quarles & Brady LLP

(57) ABSTRACT

A front wheel power system which may enable independent control of power to each wheel as well as yield direct control over average and differential front wheel torques.

20 Claims, 4 Drawing Sheets

(56) References Cited

OTHER PUBLICATIONS

Exhibit B—Photograph of a compact truck loader with a mulching head attachment, undated, Admitted Prior Art.

John Deere, Mulching Head MH60, undated, Admitted Prior Art.

Office Action for co-pending U.S. Appl. No. 13/676,657, dated Apr. 16, 2014.

* cited by examiner

TORQUE CONTROL FOR FRONT WHEEL DRIVE

FIELD OF THE INVENTION

The disclosure relates to front wheel drives and, specifically, the control of front wheel drives on work vehicles such as motor graders.

BACKGROUND

Conventional work vehicles such as, for example, motor graders, include all wheel drive capabilities with at least one motor for driving the front wheels and a transmission for transferring power from the engine or, perhaps an electric motor, to the rear wheels. During turns of the vehicle, the front wheels may travel in arcuate or circular paths and may, for the sake of vehicular efficiency as well as operating experience, be required to rotate at greater speeds than the rear wheels when the front wheels are of a diameter equal to that of the rear wheels as the front wheels may travel greater distances. Also a front wheel on the outer radius of the turn (an outer wheel) may be required to rotate at a greater speed than that of a front wheel on the inner radius of the turn (an inner wheel) as the path of the outer wheel has a greater radius than the path the inner wheel travels.

Conventional work vehicles address these challenges with open differentials and variations of limited differential including: limited slip differentials; and differentials that are self locking, locked manually or locked via software at threshold differences between actual speeds and predicted speeds of left and right wheels (detection of slippage), etc. In efforts to address the obvious challenges presented by the arrangements noted above, some solutions monitor and independently control the rotational speeds of each of the front wheels at all times based on turning angles of the front wheels and, in the case of vehicles such as motor graders, the articulation angles of the vehicle. The latter solutions have various drawbacks that demand compromises.

SUMMARY

The inventors have recognized that the mere independent control of the speeds of each of the front wheels may not provide direct control over independent response characteristics for average and differential speeds. Such an approach includes two control loops; one for the right wheel and the other for the left front wheel. Thus, there is a tradeoff between acceleration and lead acceptance smoothness on the one hand and steering and lateral traction on the other hand. The average speed at the front wheels, which is important for front wheel aggressiveness and slipping, is not controlled; it is a side effect of the loading and the control performance of the two loops. The differential speed of the two front wheels, which is important for steering performance, is not directly controlled; it is a side effect of the loading and the performance of the two speed loops.

The invention may directly address the challenges presented above by directly and independently controlling the average and differential response characteristics of the front wheels. The invention may also control response characteristics of the rear wheels to improve overall efficiency and operating experience.

DETAILED DESCRIPTION

A description of exemplary embodiments of the invention will now be detailed. The same reference numbers will be used throughout the description as occasion allows.

Figure 1:
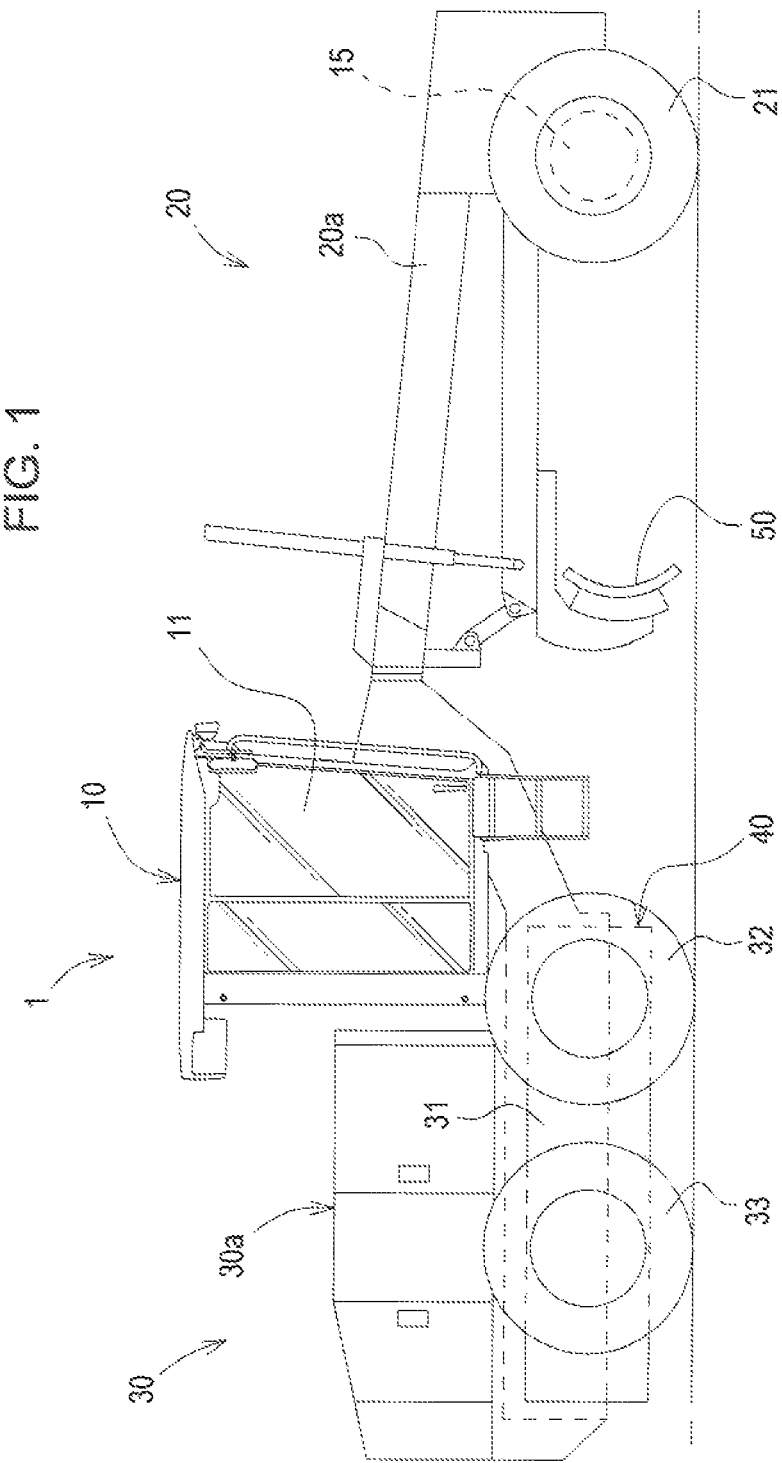
FIG. 1 illustrates an exemplary work vehicle utilizing the invention.

FIG. 1 illustrates an exemplary work vehicle, a motor grader 1, which could make use of the invention. The motor grader 1 of FIG. 1 may include: a cab 10 having a steering device 11 and a seat 12; a front portion 20 having a front frame 20a, a powered left front wheel 21, a powered right front wheel 22; a rear portion 30 including a rear frame 30a, tandem devices 31; rear wheels 32, 33; and an articulation mechanism 40 including an articulation joint 41 and an articulation cylinder 42 for angular adjustments between the front and rear portions 20, 30. Also included may be a tandem device 31 from which the rear wheels 32 receive motive power. The motor grader 1 may also include a work tool 50 for moving earth as the work vehicle 1 traverses the ground.

Figure 2:
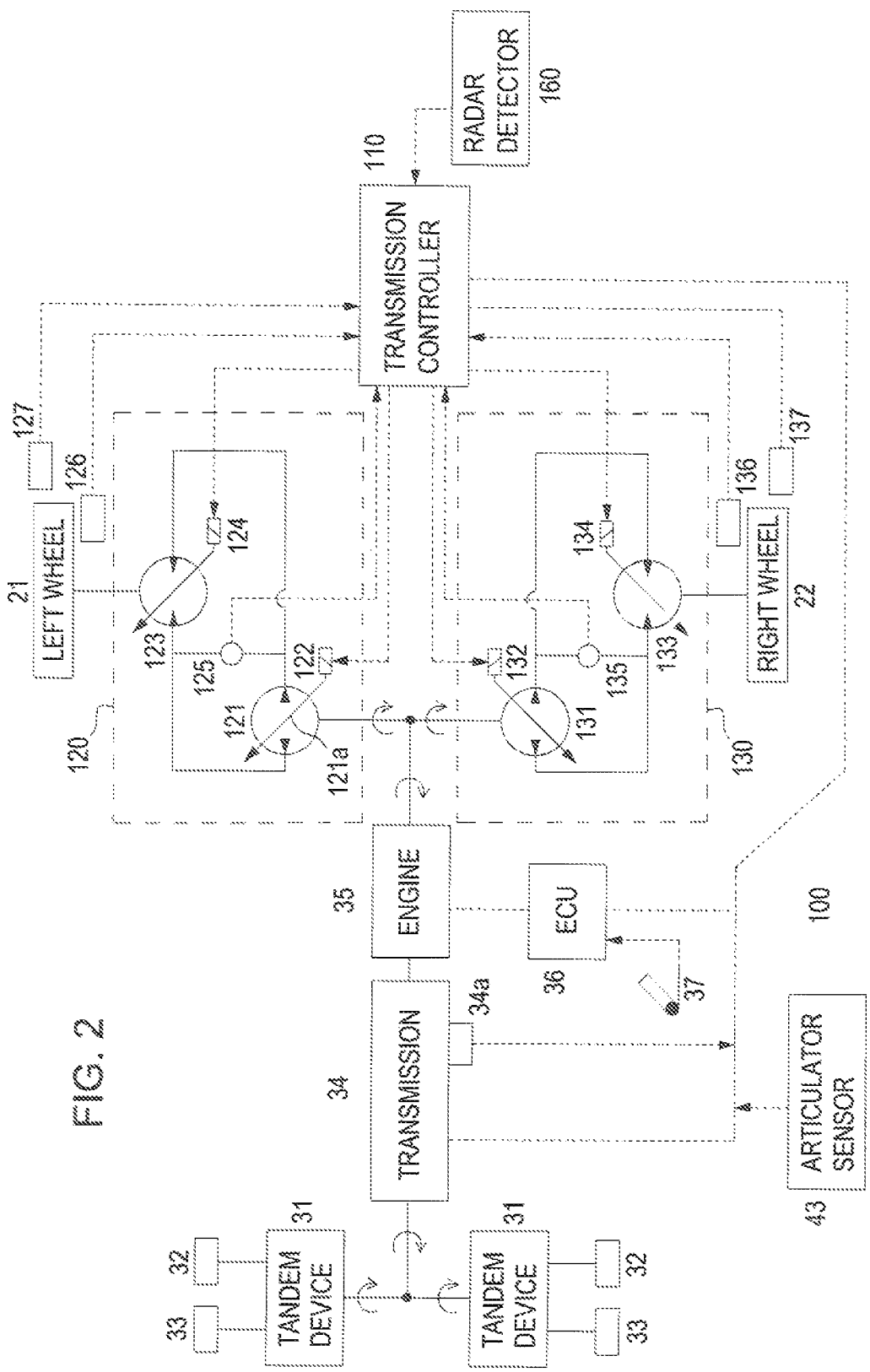
FIG. 2 illustrates a schematic of a first exemplary embodiment of the wheel drive control system to be utilized in the exemplary work vehicle of FIG. 1.

FIG. 2 represents a schematic of a first exemplary embodiment of the wheel drive control system 100 for the left and right front wheels 21, 22 and the rear wheels 32, 33 of the motor grader of FIG. 1. As illustrated, the drive system 100 may, among other things, include: tandem devices 31 through which the rear wheels 32, 33 may receive motive power; a transmission 34; a transmission controller 110 which may be in communication with, and operatively connected to: the transmission 34; a left hydrostatic transmission 120; and a right hydrostatic transmission 130. The transmission controller 110 may also be in communication with: an engine controller unit (ECU) 36; a left front wheel speed sensor 126; a left front wheel angle sensor 127; a right front wheel speed sensor 136; a right front wheel angle sensor 137; and a rear speed sensor 34a. An acceleration pedal or throttle 37 having a feature of detecting and communicating pedal positions may be in communication with the ECU 36 for throttling an engine 35, As illustrated in FIG. 2, a vehicle speed sensor such as, for example, radar detector 160 may also be available and in communication with the transmission controller 110. As illustrated, a conventional articulation angle sensor 45 may be available for detecting the articulation angle between the front and rear portions 20, 30.

As illustrated, the left hydrostatic transmission 120 may include: a left hydraulic pump 121 with variable displacement: a left pump solenoid 122 to position a left pump awash plate 121a; a left hydraulic motor 123; a left motor solenoid 124 for positioning a left motor awash plate 123a; and a left pressure sensor 125 for sensing a pressure difference between the left hydraulic pump 121 and the left hydraulic motor 123. The transmission controller 110 is in communication with the left pressure sensor 125 and operably connected to the left pump solenoid 122 and the left motor solenoid 124.

As with the left hydrostatic transmission 120, the right hydrostatic transmission 130 may include: a right hydraulic pump 131 with variable displacement; a right pump solenoid 132 to position a right pump awash plate 131a, a right hydraulic motor 133; a right motor solenoid 134 for positioning a right motor swath plate 133a; and a right pressure sensor 135 for sensing a pressure difference between the right hydraulic pump 131 and the right hydraulic motor 133. The transmission controller 110 is in communication with the right pressure sensor 135 and operably connected to the right pump solenoid 132 and the right motor solenoid 134.

As illustrated, the left and right hydrostatic transmissions 120, 130 may be mechanically connected to the engine 35. They may also be mechanically connected to left and right front wheels 20, 30 respectively.

Figure 3:
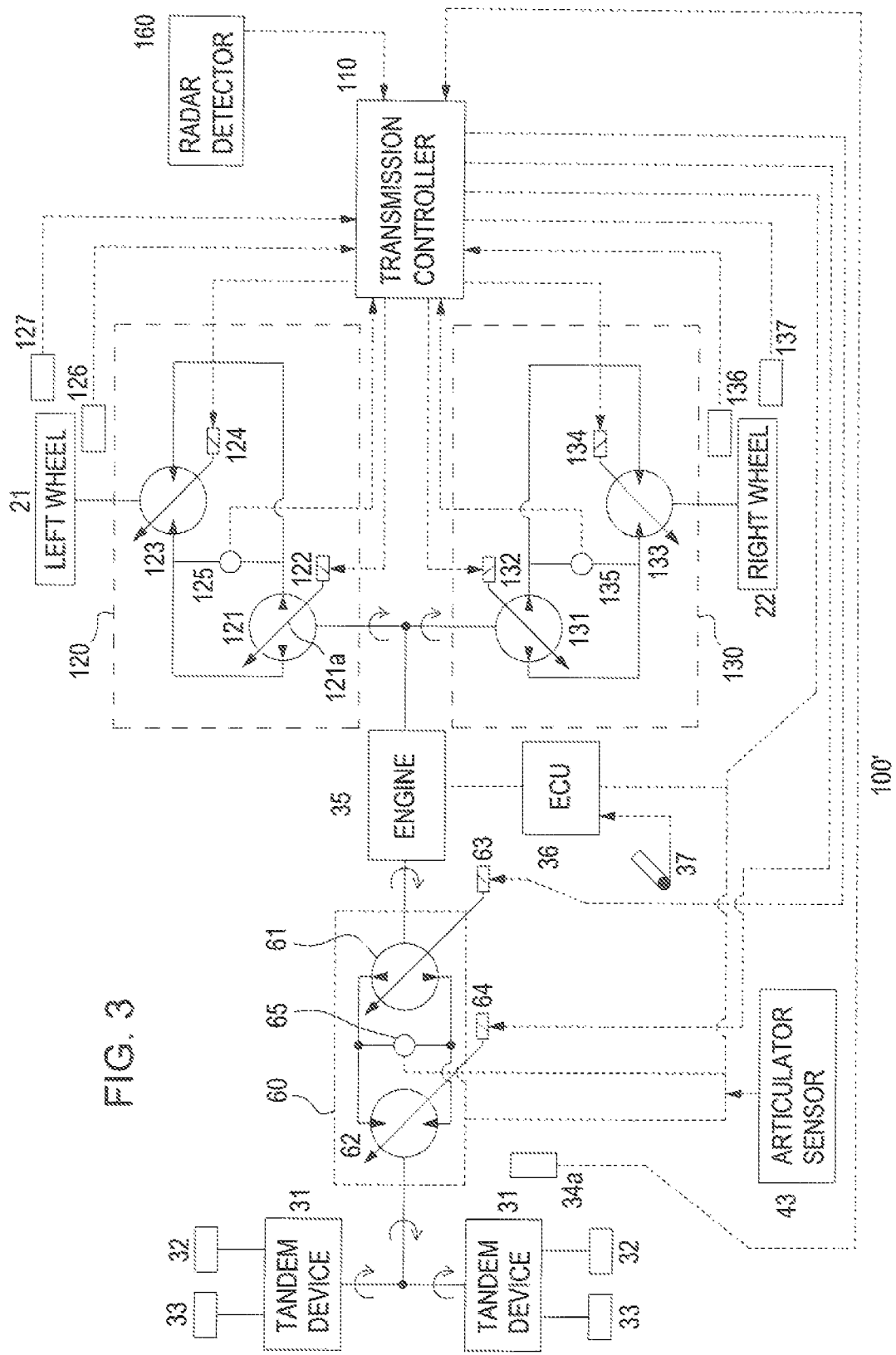
FIG. 3 illustrates a schematic of a second exemplary embodiment of the wheel drive control system.

FIG. 3 illustrates a schematic of a second exemplary embodiment of the wheel drive control system 100'. The differences between the first and second exemplary embodiments of the invention 100, 100' may be attributed to rear transmission differences. The second exemplary embodiment of the wheel drive control system 100' employs a rear hydrostatic transmission 60 in the stead of the geared transmission 34 of the first exemplary embodiment of the wheel drive control system 100. As illustrated, a speed sensor 34a may remain. As with the left and right hydrostatic transmissions 120, 130 at the front of the work vehicle the transmission controller 110 may control the awash plates 61a, 62a of the respective pump and motor 61, 62 via operable connections to the respective pump and motor solenoids 63, 64. Swash plate displacement may determine the average speed of the rear wheels 32, 33. The ECU 36 may determine current engine torque (CET) as a function of current fuel usage rate, current engine speed and current operating load), i.e., f(current fuel usage rate, current engine speed, current operating load) using a conventional engine performance formula or table, all of which are detected by the ECU 36 via conventional means.

Figure 4:
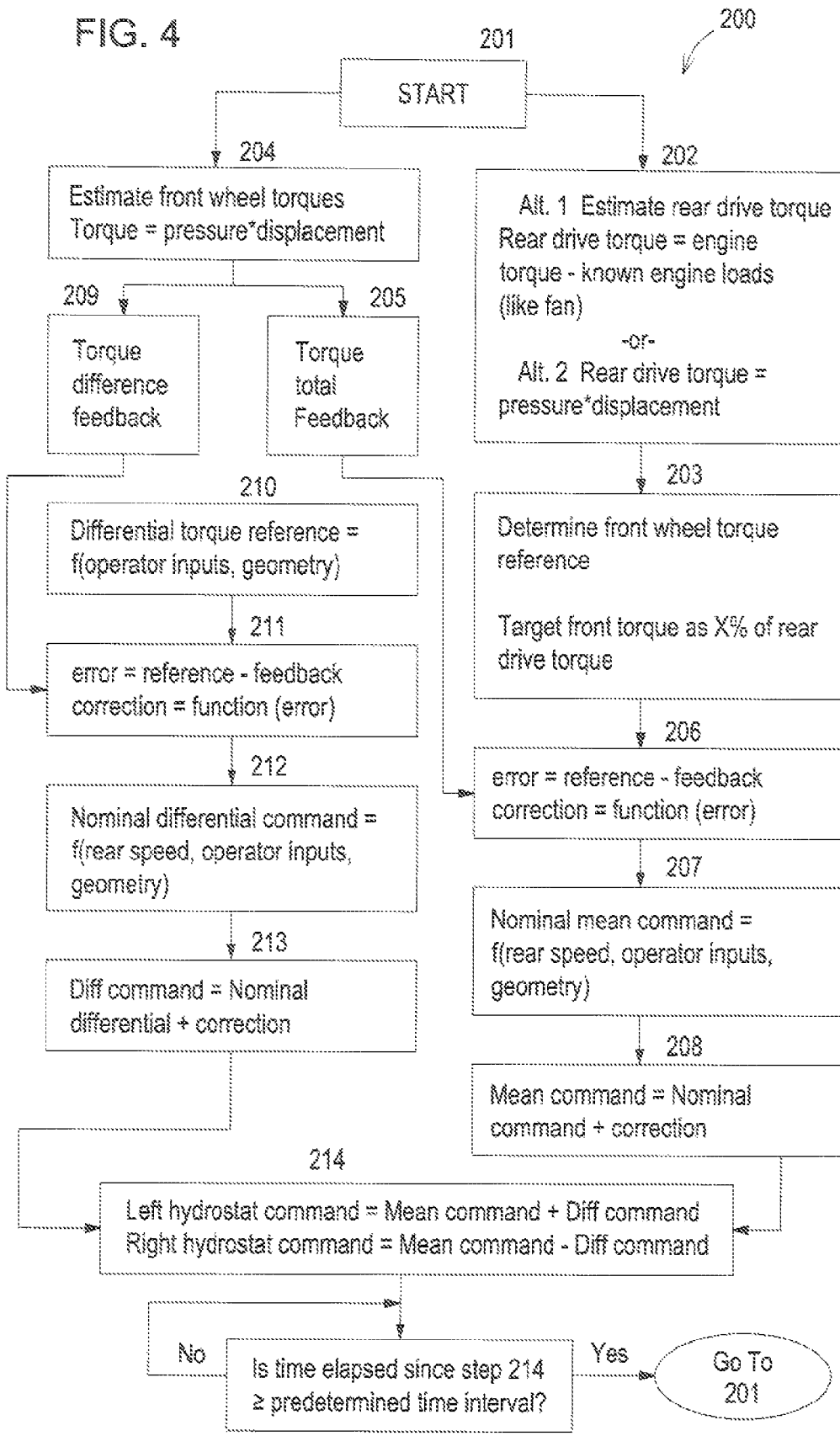
FIG. 4 illustrates an exemplary flowchart for average torque determination in the exemplary drive system of FIGS. 2 and 3.

FIG. 4 illustrates an exemplary flowchart 200 for determining average and differential front wheel torque control for the exemplary drive systems 100, 100' of FIGS. 2 and 3 and, with respect to FIG. 3 detailing the actions of the transmission controller 110 with respect to the engine controller unit (ECU) 36, the rear hydrostatic transmission 60, the rear pressure sensor 65, the rear hydraulic pump solenoid 63, the left pump solenoid 122, the left pressure sensor 125, the left front wheel angle sensor 127, the right pump solenoid 132, the right pressure sensor 135, the right front wheel angle sensor 137, the articulation, angle sensor 43, the operator input device 140 and, possibly, a vehicle speed detector separate from the power train of the motor grader 1 such as, for example, the radar speed detector 160. With respect to FIG. 2, the mechanical transmission 34 and speed sensor 34a replace the rear hydrostatic transmission 60 and its associated parts.

As illustrated in FIG. 4, torque control begins when an exemplary drive system 100 is started at 201. At step 202 the rear drive torque (RDT) may be estimated, via alternative 1, by subtracting known parasitic engine loads such as, for example, fans, etc., from the CET. At step 203 the transmission controller 110 may determine a target front wheel torque (TFT) as a percentage of the RDT.

As illustrated in FIG. 4, at step 204, the transmission controller 110 may estimate front wheel torques using pressure and displacement measurements at each of the left and right transmissions 120, 130. The pressure measurements may be taken from the left and right pressure sensors 125, 135 and the displacement measurements may be determined from displacement adjustments to the left and right hydrostatic transmissions 20, 30 from the transmission controller 110. Total front torque measured/feedback (TFTM) may then be determined, at step 205, by adding the torques calculated at the left and right front wheels 22, 32. At step 206, torque error (TE) may be determined as a difference between TFT and TFTM while a correction command (CC) may be determined as a function of TE via a conventional formula or lookup table.

At step 207, the nominal can command (NMC), i.e., the signal for adjusting displacement, may be determined as a function of rear speed, operator inputs, and vehicle geometry such as, for example articulation angle, wheel turning angle, etc., i.e., nominal mean command=f(rear speed, operator inputs, vehicle geometry). The mean command (MC) for each of the front wheels 20, 30 may then, at step 208, be determined as the sum of NMC and CC, i.e., MC=NMC+CC.

At step 209, the differential torque measured/feedback (DTM) may be determined by taking the difference between the torques measured at the left and right front wheels 22, 32, i.e. the difference between the left front wheel torque (LWT) and the right front wheel torque (RWT). At step 210, the differential torque reference/target (DTT) may be determined via operator inputs and vehicle geometry. At step 211, differential torque error (DTE) may be calculated as DTT−DTM and a differential torque correction command (DCC) may be determined as a function of DTE via a conventional formula or lookup table.

At step 212, a nominal differential torque command (NDTC) may be determined as a function of rear speed, operator inputs and vehicle geometry. At step 213 the differential command (DC) may be calculated as the sum of NDTC and DCC.

Finally, at step 214 the left displacement command for the left hydrostatic transmission 20 may be determined as MC+DC and the right displacement command for the right hydrostatic transmission 30 may be determined as MC−DC.

Please note that step 202 RDT may be estimated via alternative 2 which is by multiplying current displacements and measured pressures at the rear hydrostatic transmission 60, an estimation which is relevant to the alternative exemplary drive system of FIG. 3.

Also, note that displacement determinations may be made with zero ("0") or non-existent values for front wheel turning angles and articulation angles. Thus, although turning and articulation angle sensors 127, 45 are preferred for greater estimate accuracy, the torque control system may function without a turning angle sensor 127 or an articulation angle sensor 45.

Having described the exemplary embodiments above, it will become apparent that various modifications can be made without departing from the scope of the mention as defined in the accompanying claims.

The invention claimed is:

1. A drive system for a vehicle having a frame, the drive system comprising:
 a front portion, a first front wheel, a second front wheel, a front hydrostatic system for powering the first and second front wheels the power system capable of applying torque to the first and second front wheels independently;
 a rear portion, including rear wheels and a rear power system;
 an engine;
 an operator input device for detecting and communicating a demand on the drive system by the operator; and
 a controller in communication with the operator input device, the controller connected to the rear drive system and operatively connected to the front hydrostatic power system, the controller determining a target front wheel torque as a percentage of a rear drive torque, the controller determining a feedback front wheel torque based on pressure and displacement measurements from the front hydrostatic power system, the controller determining a correction displacement command for the left and right front wheels as a function of the difference between the target front wheel torque and the feedback front wheel torque, the controller determining a nominal mean displacement command for the left and right front wheels as a function of at least a measured rear speed and the demand on the drive, the controller determining a mean displacement command by adding the nominal mean displacement command and the displacement correction command, the controller determining a target differential torque at least as a function of the demand on the front wheel drive system, the controller determining a measured differential torque as the difference between the measured left front wheel torque and the measured right front wheel torque, the controller determining a differential correction command as a function of the difference between the target differential torque and the measured differential torque, the controller determining a nominal differential front wheel displacement command as a function of at least the demand, the measured rear speed and the vehicle geometry, the controller then calculating a differential displacement command for the first and second front wheels by summing the nominal differential command and the differential correction command.

2. The drive system of claim 1, further including a wheel angle sensor for detecting a turning angle of the first and second front wheels:
wherein the controller is in communication with the wheel angle sensor and the controller further determines the target differential torque as a function of the turning angle.

3. The drive system of claim 2, further including a vehicle articulation sensor for sensing vehicle articulation, wherein the controller determines the nominal mean displacement command for the first and second front wheels as a function of at least the measured rear speed, the demand on the drive system, the wheel steering angle, and an articulation angle.

4. The drive system of claim 3, wherein, the controller, determines a target differential torque as a function of the demands on the front wheel drive system and the wheel steering angle, the controller determining a measured or reference differential torque as a function of the current displacements and measured pressures at the front wheel power system, the controller determining a differential correction command as a function of the difference between the target and feedback differential torques, the controller determining a nominal differential front wheel displacement command as a function of at least the demands, the measured rear speed and the steering angle, the controller then calculating a differential displacement command for the first and second front wheels by summing the nominal differential command and the differential correction command.

5. The drive system of claim 1, wherein the controller determines a hydrostatic command displacement for the first front wheel as the sum of the mean displacement command and the differential displacement command.

6. The drive system of claim 5, wherein the controller determines a hydrostatic command displacement for the second front wheel as the difference between the mean displacement command and the differential displacement command.

7. The drive system of claim 1, further including a rear hydrostatic transmission, wherein the controller determines rear drive torque as a function of pressure and displacement at the rear hydrostatic transmission.

8. The drive system of claim 1, further including a rear geared transmission, wherein the controller determines rear drive torque as a difference between an engine torque and a sum of known loads on the engine.

9. The drive system of claim 8, wherein the controller estimates the engine torque as a function of current fuel usage rate and current engine speed.

10. The drive system of claim 1, wherein the front hydrostatic power system comprises a first hydrostatic power system and a second hydrostatic power system, the second hydrostatic power system independent of the first hydrostatic power system.

11. The drive system of claim 1, wherein the operator input device is a throttle adjuster.

12. The drive system of claim 1, wherein the operator input device is an aggressive drive adjuster.

13. A work vehicle having a frame and a drive system, the drive system comprising:
a front portion, a first front wheel, a second front wheel, a first power system, including a first hydrostatic transmission for powering the first front wheel, and a second hydrostatic transmission for powering the second front wheel, the first and second hydrostatic transmissions capable of operating independently of each other;
a rear portion, including a rear drive with rear wheels and a second power system, including a rear transmission for delivering torque to the rear wheels, the second power system capable of operating independently of the first and second hydrostatic transmissions;
an engine;
an operator input device for detecting and communicating a demand on the drive system by the operator; and
a controller in communication with the operator input device and the wheel angle sensor, the controller operatively connected to the first and second power systems, the controller determining a target front wheel torque as a percentage of a rear drive torque, the controller determining a feedback front wheel torque based on pressure and displacement measurements from the first power system, the controller determining a correction displacement command for the left and right front wheels as a function of the difference between the target front wheel torque and the feedback front wheel torque, the controller determining a nominal mean displacement command for the left and right front wheels as a function of at least a measured rear speed, the demand on the drive system and a wheel steering angle, the controller determining a mean displacement command by adding the nominal mean displacement command and the displacement correction command, the controller determining a target differential torque at least as a function of the demands on the first power system, the controller determining a measured or reference differential torque as the difference between the measured left front wheel torque and the measured front right front wheel torque, the controller determining a differential correction command as a function of the difference between the target and measured differential torques, the controller determining a nominal differential front wheel displacement command as a function of at least the demands, the measured rear speed and the vehicle geometry, the controller then calculating a differential displacement command for the left and right front wheels by summing the nominal differential command and the differential correction command.

14. The drive system of claim 13, further including a wheel angle sensor for detecting a steering angle of the first and second front wheels; and
wherein the controller further determines the target differential torque as a function of the steering angle.

15. The drive system of claim 13, wherein controller determines a hydrostatic command displacement for the left front wheel as the sum of the mean displacement command and the differential displacement command.

16. The drive system of claim 15, wherein the controller determines a hydrostatic command displacement for the right front wheel as the difference between the mean displacement command and the differential displacement command.

17. A method of controlling torque on a drive system of a work vehicle having a front portion, a rear portion, a first front hydrostatic transmission for an application of torque to a first front wheel, a second front hydrostatic transmission for an application of torque to a second front wheel, a rear wheel power system for applying torque to a rear wheel, a speed sensor for estimating the speed of the rear wheel, a wheel angle sensor for detecting a turning angle of the first and second front wheels, an articulation angle sensor for determining an articulation angle between the front portion and the rear portion, an engine, and a controller for making demands on the first and second hydrostatic transmissions, and the rear wheel power system, the drive system including a controller through which steps may be taken to control torque, the method comprising the following steps:
   determining a target differential torque as a function of the demands on the front wheel drive system and a wheel steering angle;
   determining a reference differential torque as the difference between a function of the current displacements and measured pressures of the first front wheel and a function of the current displacements and measured pressures of the second front wheel;
   determining a differential correction command as a function of the difference between the target and feedback differential torques;
   determining a nominal differential front wheel displacement command as a function of at least the demands, the measured rear speed and the steering angle; and
   calculating a differential displacement command for the first and second front wheels by summing the nominal differential command and the differential correction command.

18. The method of claim 17, further comprising the following steps:
   estimating a current rear wheel torque;
   estimating a feedback front wheel torque as a function of detected pressures and displacements at the first and second front hydrostatic transmissions, respectively;
   calculating a target front wheel torque as a predetermined percentage of the current torque on the rear wheel;
   detecting a rear wheel speed;
   determining a front wheel displacement correction command as a function of the difference between the target front wheel torque and the feedback front wheel torque;
   determining a nominal mean displacement command for the left and right front wheels as a function of at least a measured rear speed and the demand on the drive system; and
   determining a mean displacement command by adding the nominal mean displacement command and the displacement correction command.

19. The method of claim 18, further comprising the following step:
   determining a hydrostatic command displacement for the first front wheel as the sum of the mean displacement command and the differential displacement command.

20. The method of claim 19, further comprising the following step:
   determining a hydrostatic command displacement for the second front wheels as the difference between the mean displacement command and the differential displacement command.

* * * * *

UNITED STATES PATENT AND TRADEMARK OFFICE
CERTIFICATE OF CORRECTION

PATENT NO.         : 8,880,301 B2                                              Page 1 of 1
APPLICATION NO.    : 13/676388
DATED              : November 4, 2014
INVENTOR(S)        : Todd Velde It is certified that error appears in the above-identified patent and that said Letters Patent is hereby corrected as shown below:

In the Specification,

Column 1, line 48:  "lead acceptance" should be --load acceptance--
Column 1, line 50:  "age speed at" should be --age speed of--
Column 2, line 53:  "awash" should be --swash--
Column 2, line 55:  "awash" should be --swash--
Column 2, line 64:  "awash" should be --swash--
Column 2, line 66:  "swath" should be --swash--
Column 3, line 21:  "awash" should be --swash--
Column 4, line 1:   "nominal can command" should be --nominal mean command--

Signed and Sealed this
Seventeenth Day of February, 2015

Michelle K. Lee
*Deputy Director of the United States Patent and Trademark Office*